United States Patent
Christensen et al.

(10) Patent No.: US 8,111,473 B2
(45) Date of Patent: Feb. 7, 2012

(54) METHOD TO EVALUATE A DATA STORAGE DEVICE USING MAGNETIC SPACING LOSSES

(75) Inventors: Eric Rolf Christensen, Tucson, AZ (US); W. Stanley Czarnecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 12/550,319

(22) Filed: Aug. 28, 2009

(65) Prior Publication Data

US 2011/0051274 A1    Mar. 3, 2011

(51) Int. Cl.
*G11B 27/36* (2006.01)
(52) U.S. Cl. ........................................................ 360/31
(58) Field of Classification Search ........................ None
See application file for complete search history.

(56) References Cited

U.S. PATENT DOCUMENTS

| | | | |
|---|---|---|---|
| 5,410,439 A | 4/1995 | Egbert et al. | |
| 5,909,330 A | 6/1999 | Carlson et al. | |
| 6,094,318 A | 7/2000 | Kim | |
| 6,249,393 B1 * | 6/2001 | Billings et al. | 360/31 |
| 6,771,440 B2 | 8/2004 | Smith | |
| 6,822,821 B2 * | 11/2004 | Gan et al. | 360/75 |
| 6,975,467 B1 | 12/2005 | Lewkowicz et al. | |
| 7,180,692 B1 | 2/2007 | Che et al. | |
| 7,230,781 B2 | 6/2007 | Ma et al. | |
| 7,298,566 B2 | 11/2007 | Ueda et al. | |
| 2005/0188246 A1 * | 8/2005 | Emberty et al. | 714/5 |

* cited by examiner

*Primary Examiner* — Jason Olson
(74) *Attorney, Agent, or Firm* — Dale F. Regelman; Quarles & Brady LLP

(57) ABSTRACT

A method of evaluating the performance of a magnetic recording system, comprising measuring a first set of finite impulse response filter tap values at time t1, measuring a second set of finite impulse response filter tap values are measured at time t2, where time t2 is subsequent to time t1, and calculating an actual loss parameter using the first set of tap values and the second set of tap values. The method then compares the actual loss parameter with a total effective loss threshold.

17 Claims, 8 Drawing Sheets

METHOD TO EVALUATE A DATA STORAGE DEVICE USING MAGNETIC SPACING LOSSES

FIELD OF THE INVENTION

Various implementations, and combinations thereof, are related to evaluation of a data storage device by determining magnetic spacing losses.

BACKGROUND OF THE INVENTION

Data storage subsystems include various components for causing a read/write head to write to and read from a data storage medium. A recording channel is the path between a data format control and the data storage medium. Within the recording channel, a write signal is delivered to a transducer of a read/write head for recording data on the data storage medium, and a read signal is generated by a read transducer disposed on the read/write head.

Among many potential failure mechanisms of storage devices is degradation of the playback signal quality or magnitude. Degradation of playback signal may arise from any of several conditions, such as an increase in the head to storage medium spacing, an increase in the thickness of the air film between the head and storage medium, formation of stationary media debris particulates on the head air bearing surface, pole tip recession occurring over time in a magnetic gap of write or read head transducers, and the like.

SUMMARY OF THE INVENTION

In one embodiment, a method of evaluating the performance of a data storage device is presented. The results of such an evaluation may be used for failure prediction, storage device design, storage device optimization.

The method establishes a total effective loss parameter threshold, determines an actual total effective loss parameter for the data storage device, and if the actual total effective loss parameter is greater than the total effective loss parameter threshold, the method takes the data storage device out of service.

In another embodiment, an article of manufacture including a computer readable medium including computer readable program code disposed therein to evaluate the performance of a data storage device. The computer readable program code includes a series of computer readable program steps to effect retrieving a pre-determined total effective loss parameter threshold, determining an actual total effective loss parameter for said data storage device, and if said actual total effective loss parameter is greater than said total effective loss parameter threshold, generating a message to take the data storage device out of service.

In yet another embodiment, a computer program product encoded in a computer readable medium and usable with a programmable computer processor for evaluating the performance of a magnetic recording system is present. The computer program product includes computer readable program code which causes the programmable processor to retrieve a pre-determined total effective loss parameter threshold, determine an actual total effective loss parameter for said data storage device, and if said actual total effective loss parameter is greater than said total effective loss parameter threshold, taking the data storage device out of service.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Applicants' invention is described herein in a data storage embodiment utilizing a plurality of tape drives and a plurality of magnetic tape storage media. This description should not be taken as limiting. Rather, Applicants' invention may be used to evaluate the performance of storage devices generally.

Figure 1:
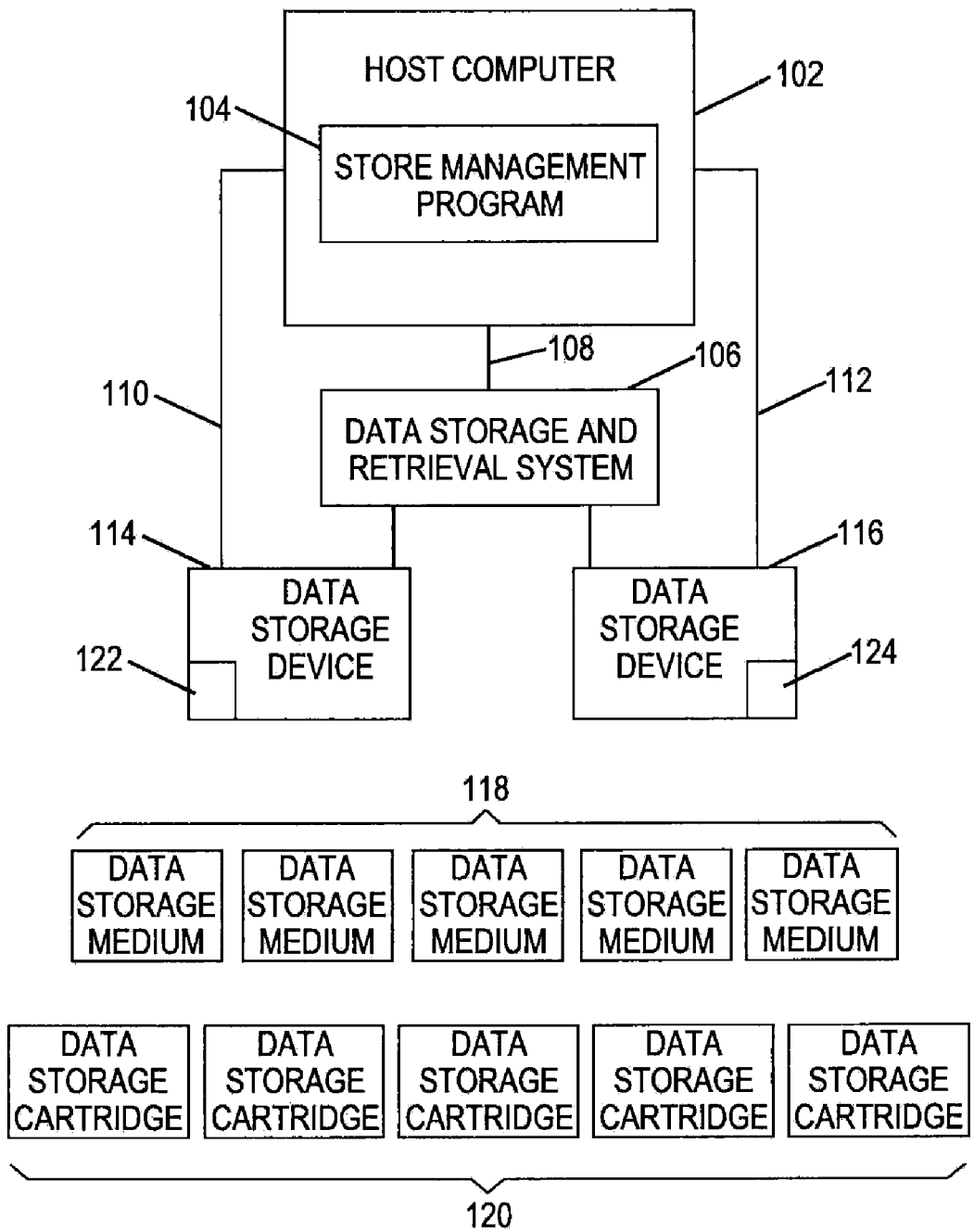
FIG. 1 is an illustration of an exemplary hardware and software environment in which embodiments of the present invention are implemented.

Referring now to FIG. 1, illustrates a hardware and software environment in which one embodiment of the present invention is implemented. Host computer 102 includes, among other programs, a storage management program 104. In certain embodiments, host computer 102 comprises a single computer. In alternative embodiments, host computer 102 comprises one or more mainframe computers, one or more work stations, one or more personal computers, combinations thereof, and the like.

Information is transferred between the host computer 102 and secondary storage devices managed by a data storage and retrieval system, such as data storage and retrieval system 106, vial communication links 108, 110, and 112. Communication links 108, 110, and 112, comprise a serial interconnection, such as an RS-232 cable or an RS-422 cable, an Ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, combinations thereof, and the like.

In the embodiment shown in FIG. 1, data storage and retrieval system 106 includes data storage devices 114 and 116. In alternative embodiments, data storage and retrieval system 106 includes a single data storage device. In alternative embodiments, data storage and retrieval system 106 includes more than two data storage devices.

A plurality of portable tape storage media 118 are moveably disposed within data storage and retrieval system 106. In certain embodiments, the plurality of tape storage media 118 are housed in a plurality of portable tape cartridges 120. Each such portable tape cartridges may be removeably disposed in an appropriate data storage device.

Data storage and retrieval system 106 further includes program logic to manage data storage devices 114 and 116, and plurality of portable tape cartridges 120. In certain embodiments, each data storage devices 114 and 116 includes a controller, such as controllers 122 and 124, comprising such program logic.

In alternative embodiments, data storage and retrieval system 106 and host computer 102 may be collocated on a single apparatus. In this case, host computer 102 may be connected to another host computer to, for example, translate one set of library commands or protocols to another set of commands/protocols, or to convert library commands form one communication interface to another, or for security, or for other reasons.

Data storage and retrieval system 106 comprises a computer system, and manages, for example, a plurality of tape drives and tape cartridges. In such embodiments, data storage devices 114 and 116 may be any suitable tape drives known in the art, e.g., the TotalStorage™ 3590 tape drives (TotalStorage is a trademark of IBM Corporation). Similarly, tape cartridges 120 may be any suitable tape cartridge device known in the art, such as ECCST, Magstar, TotalStorage™ 3420, 3480, 3490E, 3580, 3590 tape cartridges, etc.

Figure 2:
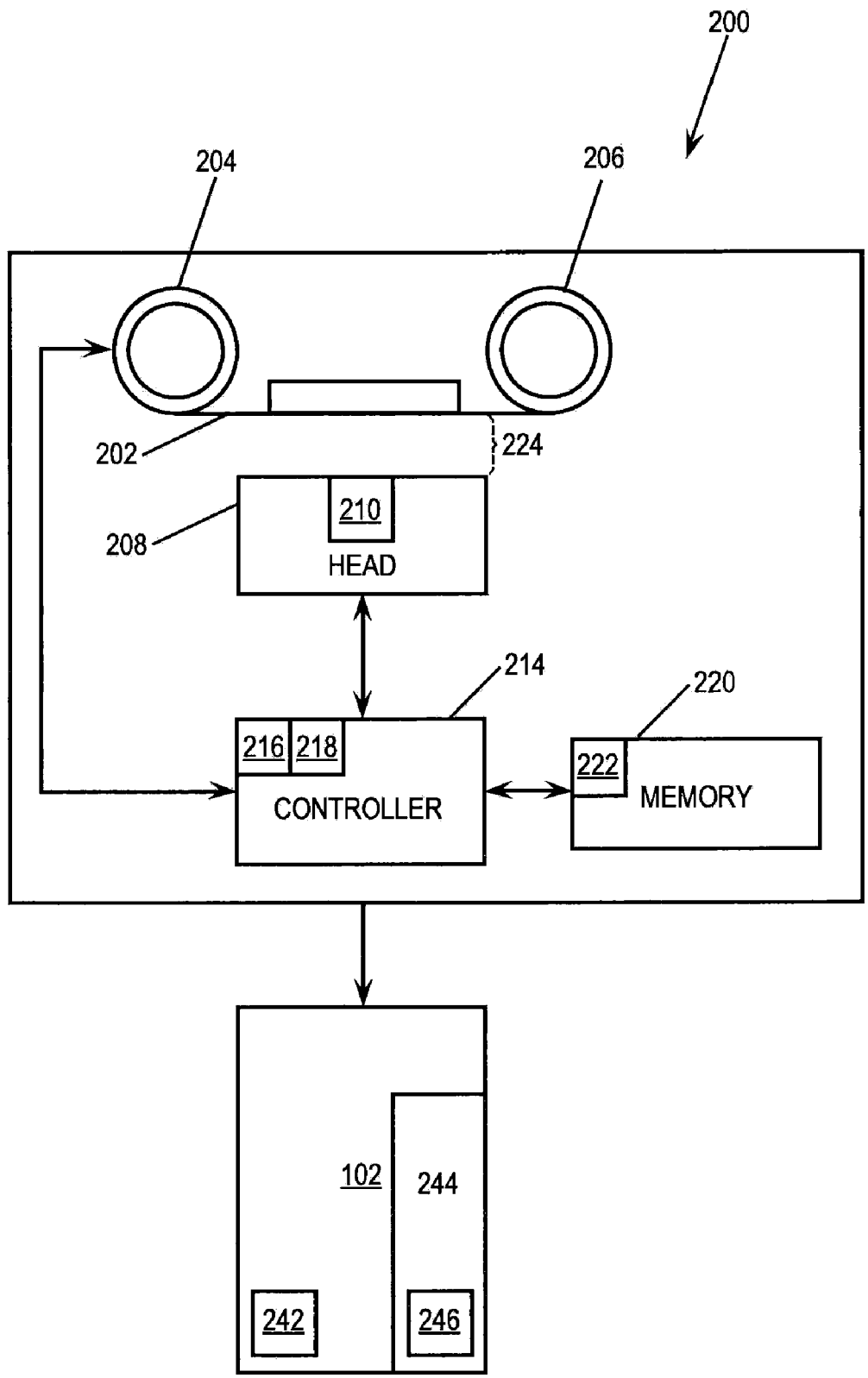
FIG. 2 is an illustration of an exemplary tape drive unit of FIG. 1.

Referring now to FIG. 2, exemplary tape drive unit 200 is presented. When writing to a magnetic tape storage medium, such as magnetic tape 202, a portion of the tape medium is disposed on a first rotatable reel, such as reel 204, and a portion of the tape medium is disposed on a second rotatable reel, such as reel 206. The rotatable reels are moved such that tape storage medium 202 is move from one reel, past tape head 208, and onto the other reel. Tape head 208 comprises write head 210, wherein write head 210 encodes information in tape storage medium 202 as that medium travels past write head 210. As those skilled in the art will appreciate, tape head 208 may comprise other elements and components not shown in FIG. 2.

In the illustrated embodiment of FIG. 2, tape head 208 is in communication with controller 214. In certain embodiments, controller 214 is integral with tape head 208. Further in the illustrated embodiment of FIG. 2, controller 214 comprises processor 216 and data buffer 218. Controller 214 is in communication with computer readable medium 220. Instructions 222 are encoded in computer readable medium 220.

In certain embodiments, computer readable medium 220 is integral with controller 214. In the illustrated embodiment of FIG. 2, reel 204, reel 206, tape head 208, controller 214, and computer readable medium 220 are disposed within tape drive unit 200. As those skilled in the art will appreciate, tape drive unit 200 may comprise other elements and components not shown in FIG. 2.

In the illustrated embodiment of FIG. 2, host computer 102 is in communication with data storage device 200. Further in the illustrated embodiment of FIG. 2, host computer 102 comprises processor 242, computer readable medium 244, and computer readable program code 246 encoded in computer readable medium 244.

Figure 3A:
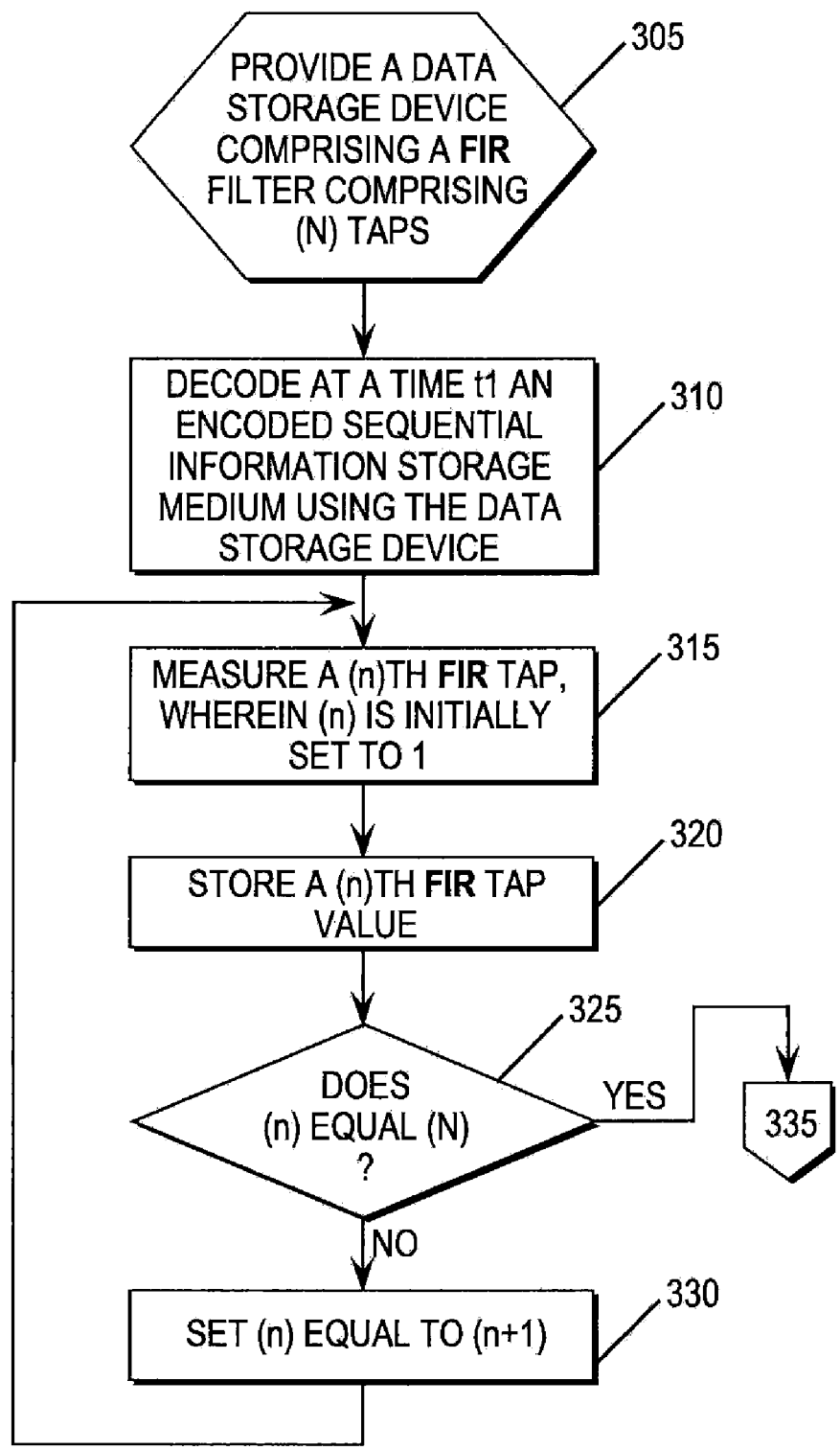
FIG. 3A summarizes certain initial steps of Applicant's method.

FIG. 3A summarizes Applicants' method to evaluate the performance of a data storage device. As those skilled in the art will appreciate, read element 210 detects data encoded in a moving sequential information storage medium 202. Read element 210 comprises one element in a read channel which decodes data written to sequential information storage medium 200. Such a read channel further comprises a finite impulse response (FIR) filter, sometimes referred to as a mid-linear filter.

A FIR filter is a type of digital filter used in Digital Signal Processing (DSP) applications. FIR filters are used to modify the frequency response of ideal partial response maximum likelihood (PRML) channels. As the frequency response of a recording channel changes over time as a result of channel hardware usage, the FIR filter compensates for nonlinear signal losses in an effort to maintain a match to an ideal PRML channel frequency response. Further, a FIR tap is a coefficient/delay pair indicative of the amount of memory required to implement the filter, the number of calculations required, and the amount of "filtering" the filter can do.

Applicants' method to evaluate the performance of a data storage device utilizes a plurality of FIR taps. Referring now to FIG. 3A, in step 305 the method provides a data storage device comprising a FIR filter comprising (N) taps, wherein (N) is greater than or equal to 1. In certain embodiments, (N) is greater than 1. In certain embodiments, (N) is greater than 5.

In step 310, the method at a time t1 decodes a sequential information storage medium using a read channel comprising, inter alia, a FIR filter. In certain embodiments, step 310 is performed by a controller, such as controller 214 (FIG. 2), disposed in the data storage device of step 305. In certain embodiments, step 310 is performed by a processor, such as processor 242 (FIG. 2), disposed in a host computer, such as host computer 102 (FIG. 2), in communication with the data storage device of step 305.

In certain embodiments initial time t1 is some time prior to the sale of the tape drive unit and the (n) FIR taps are measured by the manufacturer. In other embodiments, time t1 is some time subsequent to the sale of the tape drive unit but prior to its use. In such an embodiment, the (n) FIR taps are measured by the purchaser of the tape drive unit. In yet other embodiments, time t1 occurs at any time during the tape drive's life span.

In step 315, the method measures a (n)th FIR tap, wherein (n) is initially set to 1. In certain embodiments, step 315 is performed by a controller, such as controller 214 (FIG. 2), disposed in the data storage device of step 305. In certain embodiments, step 315 is performed by a processor, such as processor 242 (FIG. 2), disposed in a host computer, such as host computer 102 (FIG. 2), in communication with the data storage device of step 305.

In step 320, the method saves at least one time t1 (n)th FIR tap value. In certain embodiments, the time t1 (n)th FIR tape value is encoded in a computer readable medium, such as computer readable medium 220, disposed in the data storage device of step 305. In certain embodiments, the time t1 (n)th FIR tape value is encoded in a computer readable medium, such as computer readable medium 244, disposed in a host computer in communication with the data storage device of step 305. In certain embodiments, step 320 is performed by a controller, such as controller 214 (FIG. 2), disposed in the data storage device of step 305. In certain embodiments, step 320 is performed by a processor, such as processor 242 (FIG. 2), disposed in a host computer, such as host computer 102 (FIG. 2), in communication with the data storage device of step 305.

In step 325, the method determines if all (N) FIR taps have been monitored, i.e. if (n) equals (N). In certain embodiments, step 325 is performed by a controller, such as controller 214 (FIG. 2), disposed in the data storage device of step 305. In certain embodiments, step 325 is performed by a processor, such as processor 242 (FIG. 2), disposed in a host computer, such as host computer 102 (FIG. 2), in communication with the data storage device of step 305.

If the method determines in step 325 that all (N) FIR taps have not been monitored, then the method transitions from step 325 to step 330 wherein the method increments (n). The method transitions from step 330 to step 315 and continues as described herein.

Alternatively, if the method determines in step 325 that all (N) FIR taps have been monitored, then the method transitions from step 325 to step 335 wherein the method at a time t2, wherein time t2 is later than, i.e. subsequent to, time t1, decodes a sequential information storage medium using a read channel comprising, inter alia, a FIR filter. In certain embodiments, the sequential information storage medium of step 335 is the same sequential information storage medium that was used in step 310. In certain embodiments, the sequential information storage medium of step 335 differs from the sequential information storage medium that was used in step 310.

In certain embodiments, step 335 is performed by a controller, such as controller 214 (FIG. 2), disposed in the data storage device of step 305. In certain embodiments, step 335 is performed by a processor, such as processor 242 (FIG. 2), disposed in a host computer, such as host computer 102 (FIG. 2), in communication with the data storage device of step 305.

In step 340, the method measures a (j)th FIR tap, wherein (j) is initially set to 1. In certain embodiments, a (n)th FIR tap of step 315 corresponds to a (j)th FIR tap of step 340. In certain embodiments, step 340 is performed by a controller, such as controller 214 (FIG. 2), disposed in the data storage device of step 305. In certain embodiments, step 340 is performed by a processor, such as processor 242 (FIG. 2), disposed in a host computer, such as host computer 102 (FIG. 2), in communication with the data storage device of step 305.

In step 345, the method saves at least one time t2 (j)th FIR tap value. In certain embodiments, the time t2 (j)th FIR tape value is encoded in a computer readable medium, such as computer readable medium 220, disposed in the data storage device of step 305. In certain embodiments, the time t2 (j)th FIR tape value is encoded in a computer readable medium, such as computer readable medium 244, disposed in a host computer in communication with the data storage device of step 305. In certain embodiments, step 345 is performed by a controller, such as controller 214 (FIG. 2), disposed in the data storage device of step 305. In certain embodiments, step 345 is performed by a processor, such as processor 242 (FIG. 2), disposed in a host computer, such as host computer 102 (FIG. 2), in communication with the data storage device of step 305.

In step 350, the method determines if all (N) FIR taps have been monitored at time t2, i.e. if (j) equals (N). In certain embodiments, step 350 is performed by a controller, such as controller 214 (FIG. 2), disposed in the data storage device of step 305. In certain embodiments, step 350 is performed by a processor, such as processor 242 (FIG. 2), disposed in a host computer, such as host computer 102 (FIG. 2), in communication with the data storage device of step 305.

If the method determines in step 350 that all (N) FIR taps have not been monitored at time t2, then the method transitions from step 350 to step 355 wherein the method increments (n). The method transitions from step 355 to step 340 and continues as described herein.

Figure 4:
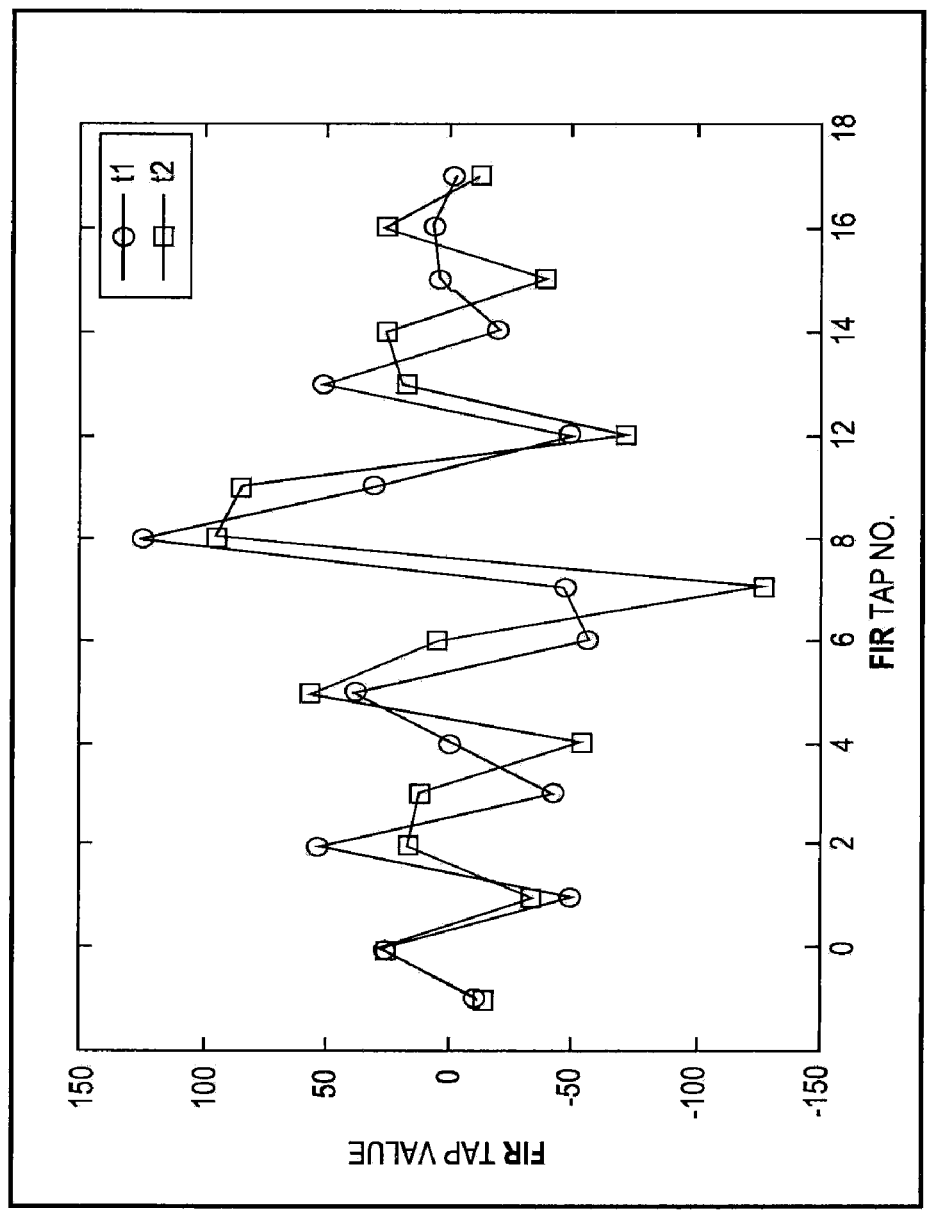
FIG. 4 graphically illustrates two sets of FIR tap values, wherein the second set was captured at a time subsequent to the first set.

FIG. 4 graphically illustrates two sets of FIR tap values. The second set of FIR tap values were measured at t2, and therefore, were taken subsequent to the first set and after some amount of usage of the data storage device of step 305.

If the method determines in step 350 that all (N) FIR taps have been monitored at time t2, then the method transitions from step 350 to step 360 wherein the method forms a transfer functions (n) by computing a Fourier Transform of the (N) FIR tap values obtained at time t1. In certain embodiments, step 360 is performed by a controller, such as controller 214 (FIG. 2), disposed in the data storage device of step 305. In certain embodiments, step 360 is performed by a processor, such as processor 242 (FIG. 2), disposed in a host computer, such as host computer 102 (FIG. 2), in communication with the data storage device of step 305.

In step 365, the method forms a transfer function (j) by computing a Fourier Transform of the (N) FIR tap values obtained at time t2. In certain embodiments, step 365 is performed by a controller, such as controller 214 (FIG. 2), disposed in the data storage device of step 305. In certain embodiments, step 365 is performed by a processor, such as processor 242 (FIG. 2), disposed in a host computer, such as host computer 102 (FIG. 2), in communication with the data storage device of step 305.

Figure 5:
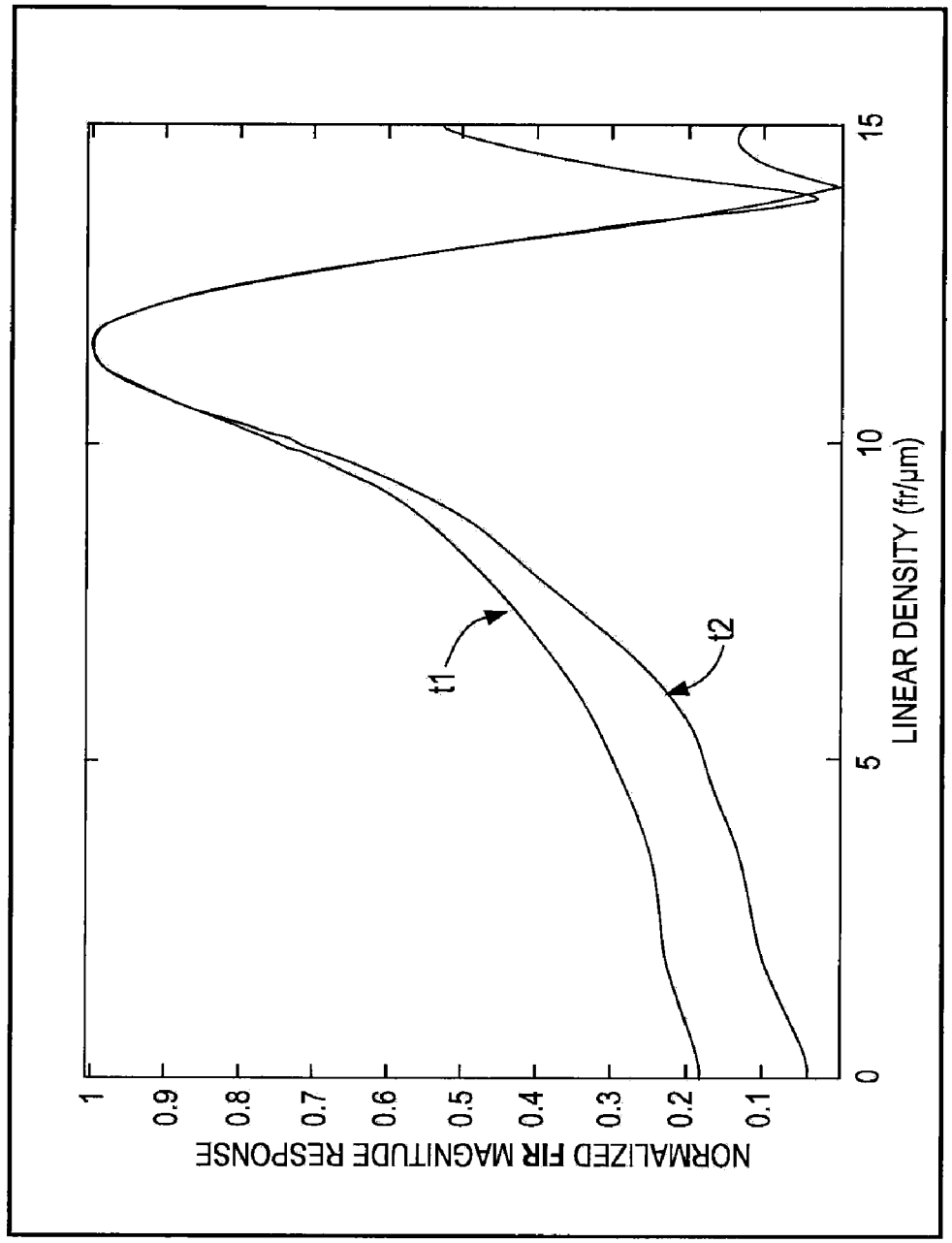
FIG. 5 graphically illustrates a FIR magnitude response from an initial time t1 and a subsequent time t2, wherein time t2 is after some usage of the magnetic recording system.

The Fourier Transform of (N) FIR taps calculates a read equalizer transfer function, or a magnitude of signal attenuation, as a function of magnetic flux reversal spatial density, as illustrated in FIG. 5, where the transfer function magnitude is normalized to unity at its maximum value.

In step 370, the method forms a FIR magnitude response ratio curve by dividing the (j) FIR transfer function of step 365 by the (n) FIR transfer function of step 360. In certain embodiments, step 370 is performed by a controller, such as controller 214 (FIG. 2), disposed in the data storage device of step 305. In certain embodiments, step 370 is performed by a processor, such as processor 242 (FIG. 2), disposed in a host computer, such as host computer 102 (FIG. 2), in communication with the data storage device of step 305.

The FIR magnitude response ratio of step 370 curve can be evaluated by the Wallace spacing loss function as:

$$f(L) = \frac{Gt2(L)}{Gt1(L)}$$

wherein the Wallace spacing function is computed by the expression:

$$f(L) = e^{-\pi dL}$$

wherein d is the total effective loss parameter (in spatial units), which includes any physical head-media separation from recording and/or read back operations and any changes in flux transition width, and L is the magnetic transition density (in flux reversals per spatial unit).

Figure 3B:
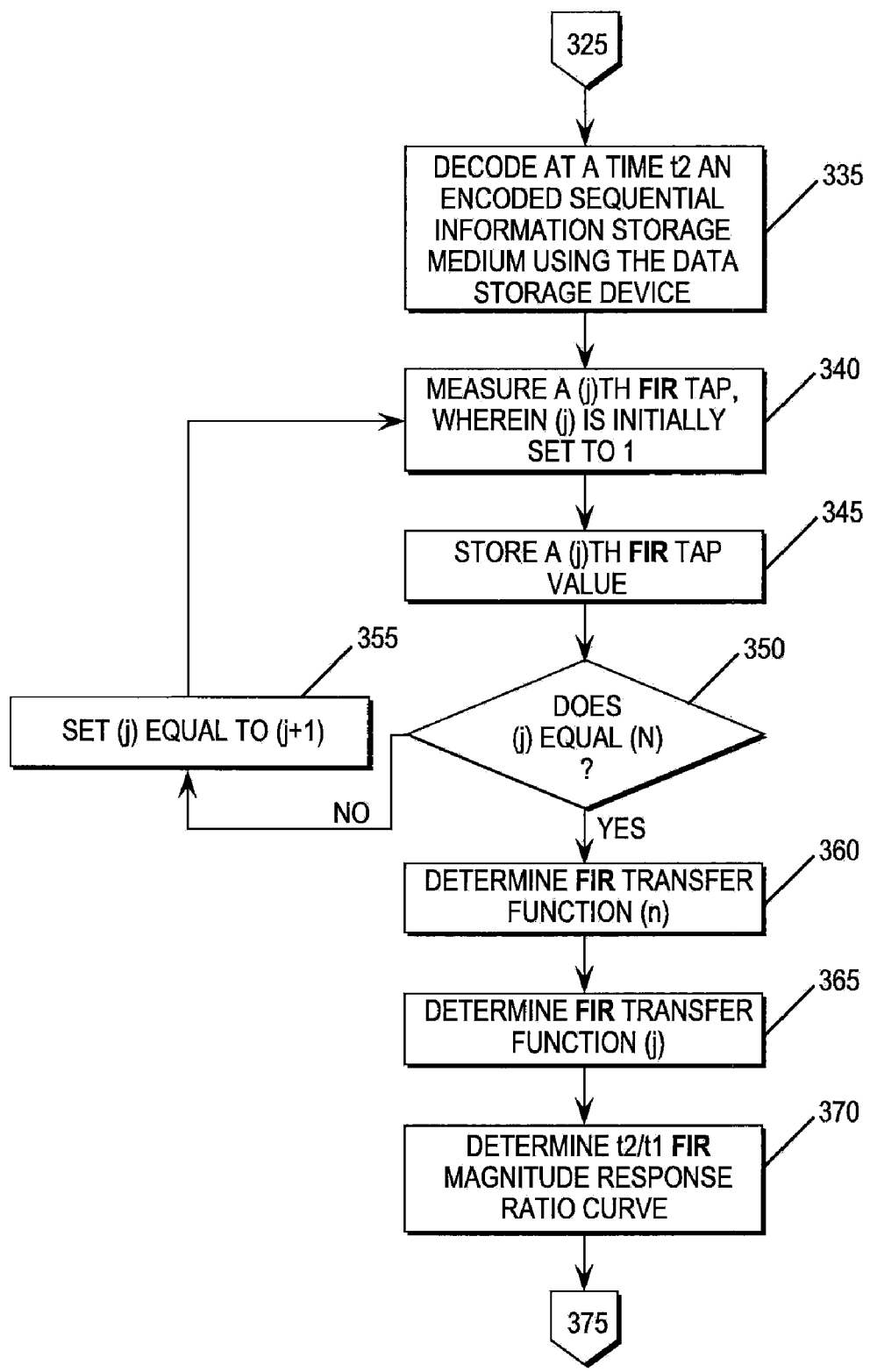
FIG. 3B summarizes certain additional steps of Applicant's method.
Figure 3C:
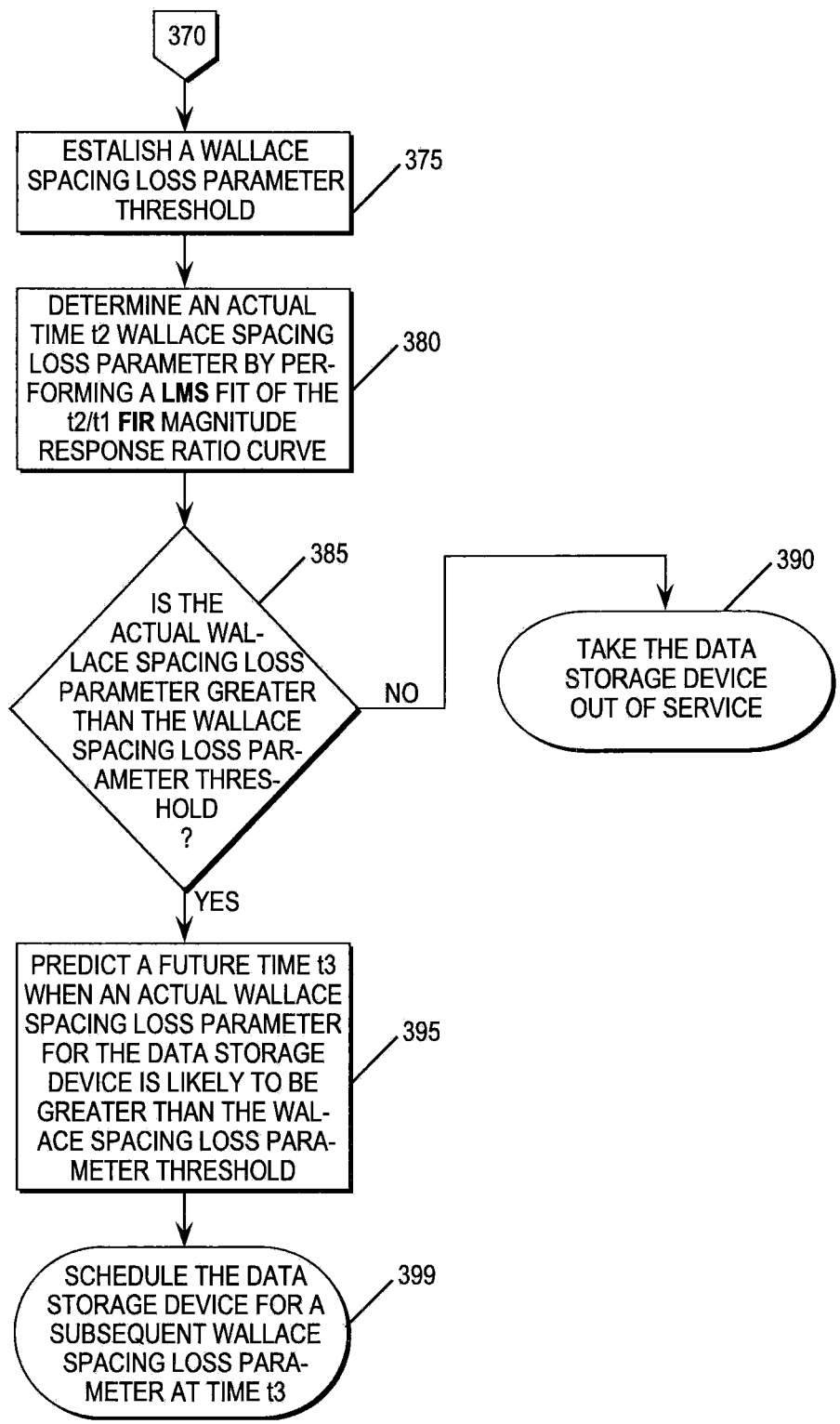
FIG. 3C summarizes certain additional steps of Applicant's method.

Referring now to FIG. 3C, in step 375 the method establishes a Wallace spacing loss parameter. In certain embodiments, step 375 is performed by the manufacturer of the data storage device of step 305. In certain embodiments, step 375 is performed by the manufacturer of a data storage library, such as data storage library 106 which includes the data storage device of step 305. In certain embodiments, step 375 is performed by the owner of the data storage device of step 305. In certain embodiments, step 375 is performed by the operator of the data storage device of step 305.

In step 380 the method determines an actual Wallace spacing loss parameter at time t2 by performing a least mean squared (LMS) fit of the FIR magnitude response ratio curve of step 370. Applicants' LMS method is a method of fitting data where the best fit is that instance of the model for which the sum of squared residuals has its least value (a residual being the difference between an observed value and the value given by the model). Using LMS method the total effective loss parameter d can be readily computed by solving the following two partial differential equations for d:

$$\frac{\partial}{\partial d}\left[\ln\frac{Gt2}{Gt1} - \pi dL - n\right] = 0 \text{ and } \frac{\partial}{\partial n}\left[\ln\frac{Gt2}{Gt1} - \pi dL - n\right] = 0$$

where the domain for L is (Lmin . . . Lmax), and n is a constant.

Figure 6:
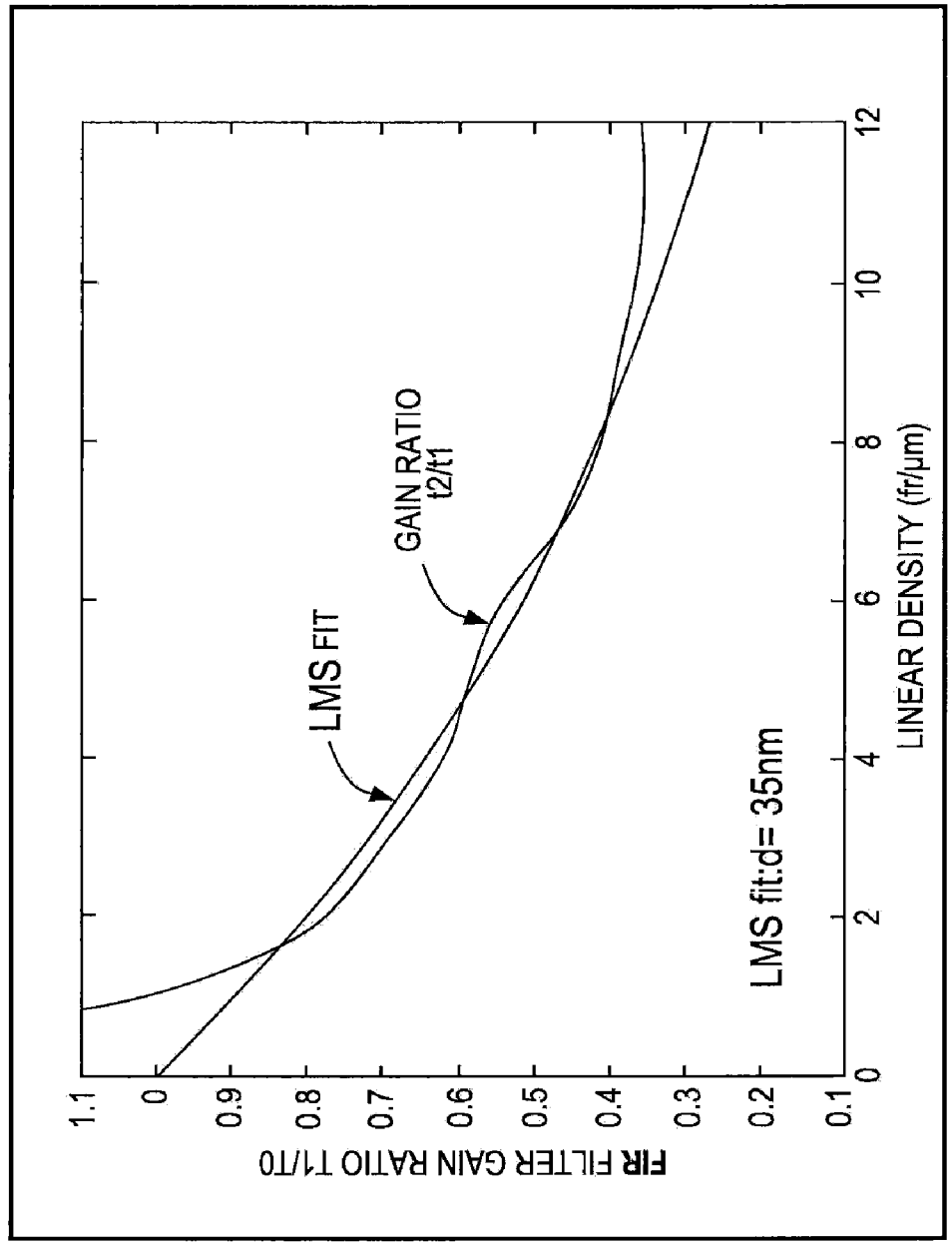
FIG. 6 graphically illustrates a FIR magnitude response ratio curve and a least means squared (LMS) fit of the Wallace spacing loss parameter to this curve.

FIG. 6 illustrates the FIR magnitude response ratio curve between time t2 and t1 and the LMS fit of the Wallace spacing loss parameter to this ratio curve. For the given example, the change in effective magnetic spacing is 35 nanometers.

In step 385, the method determines if the actual Wallace spacing loss parameter for time t2 of step 380 is greater than the Wallace spacing loss parameter threshold of step 375. In certain embodiments, step 385 is performed by a controller, such as controller 214 (FIG. 2), disposed in the data storage device of step 305. In certain embodiments, step 385 is performed by a processor, such as processor 242 (FIG. 2), disposed in a host computer, such as host computer 102 (FIG. 2), in communication with the data storage device of step 305.

If the method determines in step 385 that the actual Wallace spacing loss parameter for time t2 of step 380 is greater than the Wallace spacing loss parameter threshold of step 375, then the method transitions from step 385 to step 390 wherein the data storage device of step 305 is taken out of service. In certain embodiments, step 390 comprises generating a message to take said data storage device out of service.

Alternatively, if the method determines in step 385 that the actual Wallace spacing loss parameter for time t2 of step 380 is not greater than the Wallace spacing loss parameter threshold of step 375, then the method transitions from step 385 to step 395 wherein the method, using the actual time t2 Wallace spacing loss parameter of step 380, and using any prior actual Wallace spacing loss parameter(s), predicts a future time t3, wherein time t3 is subsequent to time t2, when an actual Wallace spacing loss parameter for the data storage device of step 305 is likely to be greater than the Wallace spacing loss parameter threshold of step 375.

In certain embodiments, step 395 is performed by a controller, such as controller 214 (FIG. 2), disposed in the data storage device of step 305. In certain embodiments, step 395 is performed by a processor, such as processor 242 (FIG. 2), disposed in a host computer, such as host computer 102 (FIG. 2), in communication with the data storage device of step 305.

In step 399, the method schedules for future time t3 a follow-up evaluation of the data storage device of step 305 using Applicants' method described herein. In certain embodiments, step 399 is performed by a controller, such as controller 214 (FIG. 2), disposed in the data storage device of step 305. In certain embodiments, step 399 is performed by a processor, such as processor 242 (FIG. 2), disposed in a host computer, such as host computer 102 (FIG. 2), in communication with the data storage device of step 305.

As will be understood, by an individual or ordinary skill in the art, Applicants' method described herein can be performed without having physical access to the device. For example, host computer 102 (FIGS. 1, 2) may be external to data storage devices 122 and/or 124. Nevertheless, data storage devices 122 and/or 124 can be evaluated using Applicants' method using the program readable program code 426 encoded in computer readable medium 244 disposed in host computer 102.

In certain embodiments, an actual Wallace spacing loss parameter d can be used to determine whether a tape drive unit should be replaced or maintenance before a failure occurs. In such embodiments, an actual Wallace spacing loss parameter may be determined at regular intervals and checked against the threshold of step 375 (FIG. 3C). When an actual Wallace spacing loss parameter exceeds the threshold, then corrective action can be taken to maintain the integrity of the data storage system. Thus, an actual Wallace spacing loss parameter can be used to assess changes to magnetic recording system components (e.g. head transducer or media) and is a useful method of evaluating component usage effects (e.g. wear, recession, material build-up, debris accumulation, ESD, corrosion, self-acting air bearing thickness, etc).

In certain embodiments, individual steps recited in FIGS. 3, 3B, and/or 3C, may be combined, eliminated, or reordered. In other embodiments, computer readable program code, such as computer readable program code 222 (FIG. 2) and/or computer readable program code 246 (FIG. 2), encoded in a computer readable medium, such as computer readable medium 220 (FIG. 2) and/or 244 (FIG. 2), is executed by a processor, such as processor 214 (FIG. 2) and/or processor 242 (FIG. 2), to perform one or more of steps recited in FIGS. 3A, 3B, and/or 3C. In yet other embodiments, the invention includes computer readable program code resident in any other computer program product encoded in a computer readable medium, where that computer readable program code is executed by a computer external to, or internal to, a data storage system, to perform one or more of steps recited in FIGS. 3A, 3B, and/or 3C In either case, the computer readable program code may be encoded in computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method of evaluating the performance of a data storage device, comprising:
    establishing a total effective loss parameter threshold;
    determining an actual total effective loss parameter for said data storage device;
    operative if said actual total effective loss parameter is greater than said total effective loss parameter threshold, taking said data storage device out of service;
    operative if said actual total effective loss parameter is not greater than said total effective loss parameter threshold, using said actual total effective loss parameter determining a future time when a total effective loss parameter for said data storage device will be greater than said total effective loss parameter threshold; and
    scheduling said data storage device for evaluation at said future time.

2. The method of claim 1, wherein said determining an actual total effective loss parameter comprises:
    measuring a first plurality of finite impulse response ("FIR") taps at time t1; and
    determining a first FIR transfer function by computing a Fourier Transform of the first plurality of FIR taps.

3. The method of claim 2, further comprising:
    measuring a second plurality of FIR taps at time t2; and
    determining a second FIR transfer function by computing a Fourier Transform of the second plurality of FIR taps;
    wherein time t2 is subsequent to time t1.

4. The method of claim 3, further comprising determining a FIR magnitude response ratio between time t2 and time t1 using said first FIR transfer function and said second FIR transfer function.

5. The method of claim 4, further comprising calculating said actual effective loss parameter using a Wallace spacing loss function and said FIR magnitude response ratio between time t2 and time t1.

6. The method of claim 5, further comprises includes solving for the total effective loss parameter (d):

$$\frac{\partial}{\partial d}\left[\ln\frac{Gt2}{Gt1} - \pi dL - n\right] = 0 \text{ and } \frac{\partial}{\partial n}\left[\ln\frac{Gt2}{Gt1} - \pi dL - n\right] = 0$$

wherein (Gt2) is the Second FIR transfer function, (Gt1) is the first transfer function, (L) is the magnitude transition density, and (n) is a constant.

7. An article of manufacture comprising a computer readable medium comprising computer readable program code disposed therein for evaluating the performance of a magnetic recording system, the computer readable program code comprising a series of computer readable program steps to effect:
    retrieving a pre-determined total effective loss parameter threshold;
    determining an actual total effective loss parameter for said data storage device;
    operative if said actual total effective loss parameter is greater than said total effective loss parameter threshold, generating a message to take said data storage device out of service;
    operative if said actual total effective loss parameter is not greater than said total effective loss parameter threshold, using said actual total effective loss parameter determining a future time when a total effective loss parameter for said data storage device will be greater than said total effective loss parameter threshold; and
    scheduling said data storage device for evaluation at said future time.

8. The article of manufacture of claim 7, wherein said computer readable program code to determining an actual total effective loss parameter further comprises a series of computer readable program steps to effect:
    measuring a first plurality of finite impulse response ("FIR") taps at time t1; and
    determining a first FIR transfer function by computing a Fourier Transform of the first plurality of FIR taps.

9. The article of manufacture of claim 8, the computer readable program code further comprising a series of computer readable program steps to effect:
    measuring a second plurality of FIR taps at time t2; and
    determining a second FIR transfer function by computing a Fourier Transform of the second plurality of FIR taps;
    wherein time t2 is subsequent to time t1.

10. The article of manufacture of claim 9, the computer readable program code further comprising a series of computer readable program steps to effect determining a FIR magnitude response ratio between time t2 and time t1 using said first FIR transfer function and said second FIR transfer function.

11. The article of manufacture of claim 10, the computer readable program code further comprising a series of computer readable program steps to effect calculating said actual effective loss parameter using a Wallace spacing loss function and said FIR magnitude response ratio between time t2 and time t1.

12. The article of manufacture of claim 11, the computer readable program code further comprising a series of computer readable program steps to effect solving for the total effective loss parameter (d):

$$\frac{\partial}{\partial d}\left[\ln\frac{Gt2}{Gt1} - \pi dL - n\right] = 0 \text{ and } \frac{\partial}{\partial n}\left[\ln\frac{Gt2}{Gt1} - \pi dL - n\right] = 0$$

wherein (Gt2) is the Second FIR transfer function, (Gt1) is the first transfer function, (L) is the magnitude transition density, and (n) is a constant.

13. A computer program product encoded in a computer readable medium and usable with a programmable computer processor for evaluating the performance of a magnetic recording system, the computer program product comprising:
    computer readable program code which causes said programmable processor to measure a first total effective loss parameter at a time t1;
    computer readable program code which causes said programmable processor to retrieve a pre-determined total effective loss parameter threshold;
    computer readable program code which, if said first total effective loss parameter is greater than said total effective loss parameter threshold, causes said programmable processor to take said data storage device out of service;

computer readable program code which, if said actual total effective loss parameter is not greater than said total effective loss parameter threshold, causes said programmable processor to use said actual total effective loss parameter to determine a future time when a total effective loss parameter for said data storage device will be greater than said total effective loss parameter threshold and schedule said data storage device for evaluation at said future time.

14. The computer program product of claim 13, wherein said computer readable program code to determine an actual total effective loss parameter further comprises:

computer readable program code which causes said programmable processor to measure a first plurality of finite impulse response ("FIR") taps at time t1 computer readable program code which causes said programmable processor to determine a first FIR transfer function by computing a Fourier Transform of the first plurality of FIR taps.

15. The computer program product of claim 14, wherein said computer readable program code to determine an actual total effective loss parameter further comprises:

computer readable program code which causes said programmable processor to measure a second plurality of FIR taps at time t2; and computer readable program code which causes said programmable processor to determine a second FIR transfer function by computing a Fourier Transform of the second plurality of FIR taps.

16. The computer program product of claim 15, further comprising computer readable program code which causes said programmable processor to determine a FIR magnitude response ratio between time t2 and time t1 using the first FIR transfer function and the second FIR transfer function.

17. The computer program product of claim 16, further comprising computer readable program code which causes said programmable processor to calculating said actual effective loss parameter using a Wallace spacing loss function and said FIR magnitude response ratio between time t2 and time t1.

* * * * *